June 20, 1967    W. VON MAYDELL ETAL    3,326,624
INFLATABLE MIRROR CONSTRUCTION CAPABLE OF BEING
FORMED INTO A PERMANENTLY RIGID STRUCTURE
Filed June 13, 1963    3 Sheets-Sheet 1

INVENTORS
WLADIMIR VON MAYDELL and
GERHARD BARTHEL

By McGlew and Toren

ATTORNEYS

INVENTORS
WLADIMIR VON MAYDELL and
GERHARD BARTHEL

By

ATTORNEYS

June 20, 1967 W. VON MAYDELL ETAL 3,326,624
INFLATABLE MIRROR CONSTRUCTION CAPABLE OF BEING
FORMED INTO A PERMANENTLY RIGID STRUCTURE
Filed June 13, 1963 3 Sheets-Sheet 3

INVENTORS
WLADIMIR VON MAYDELL and
GERHARD BARTHEL
By McGlew and Toren
ATTORNEYS 3,326,624
INFLATABLE MIRROR CONSTRUCTION CAPABLE OF BEING FORMED INTO A PERMANENTLY RIGID STRUCTURE
Wladimir von Maydell, Munich, and Gerhard Barthel, Ottobrunn, near Munich, Germany, assignors to Bolkow Gesellschaft mit beschrankter Haftung, Ottobrunn, near Munich, Germany
Filed June 13, 1963, Ser. No. 287,626
Claims priority, application Germany, June 22, 1962, B 67,769
4 Claims. (Cl. 350—293)

This invention relates in general to readily erectable structures for use in space, and in particular to a new and useful mirror construction particularly for utilizing solar energy in current supply plants of space stations and flying bodies.

The present invention has particular application in respect to the construction of a mirror structure which has particular utility for reflecting and concentrating rays from the sun for the purpose of heating suitable energy conversion systems, such as, for example, thermoelectric or thermionic converters to temperatures which may range from 1000 to 1500° K. or even to higher temperatures. Mirrors of this nature are preferably in the form of paraboloids. The useful efficiency or capacity required for mirrors of this nature amounts to several kilowatts, and it is therefore necessary to have large diameter mirrors of more than 5 meters in diameter.

Mirrors of such a large size cannot ordinarily be propelled into outer space with the available propelling means. Therefore, such mirrors have to be folded or collapsed into a fraction of their size and have to be launched in a collapsed condition in order for them to be accommodated in a rocket-operated flying body. After the flying body has reached the selected orbit altitude, the structures are converted into their true size by rapid erection means such as by inflation. Mirrors of this nature must be light as possible and they must be able to withstand the conditions prevailing in outer space, such as, for example, the electromagnetic rays and various particle arys, meteorites, etc., as well as significant temperature variations and fluctuations. In addition, the vacuum and the lack of gravity prevailing in outer space have to be considerd in such mirror construcions.

In accordance with the present invention there is provided a mirror structure or the like which is advantageously formed of a double walled annular outer member or ring which may be easily folded for transportation to outer space and then inflated when it arrives at its destination. The outer ring forms an exterior portion or frame of the structure, and a central connecting web of mirror lens portion is formed by a double wall member which may be oriented in a properly erected curved position by means of a removable inflatable member. The curve between the inflatable member and the double wall member is filled with a gas in space in order to expand the double wall member into a curve of the general form of a paraboloid. The entire structure is capable of being folded into a small condition so that it may be stored in a flying body for flying into space, and is thereafter converted to its full sized operative condition.

In accordance with a feature of the invention the double wall portion which forms the ring is formed into a relatively rigid structure by filling the space between the walls with a liquid plastic material which solidifies into a solid foam. In addition, the web portion disposed within the ring includes the two double walls which are filled with a similar plastic material, but only after this wall is disposed in a curved parabolic manner by inflating the space between the double wall member and an additional wall element. The additional wall element is constructed so that it may be easily blown off or removed from a position obstructing the surface of the double wall member which lies within the annular ring.

The double wall member which is formed into a paraboloid will form the mirror, and for this purpose the exterior surface on either one or both sides is coated with a metal such as aluminum. The double wall element is of a configuration so that it is possible to assume the exact form of a paraboloid and it is urged into such a form by the inflation of the space between it and a construction element which is also secured to the ring. This constructional element advantageously includes at least one separating area for the purpose of effecting its removal after the supporting skeleton has been completely erected.

The annular ring or torus which will be formed by the plastic between the double walls of the first ring element is connected with the double wall element which forms the paraboloid mirror in one plane, which plane is determined by means of an encircling member or small ring which has a constant diameter which is secured at the inner side of the larger ring frame.

According to a preferred embodiment, the ring frame and the paraboloid dish consist of a synthetic material and carry a metal layer on the outwardly directed surfaces. The synthetic material may be, for example, a polyester. The supporting skeleton comprising the frame and central web or lens portion is formed in situ in space from synthetic foam which is filled in a liquid condition and which solidifies after having been filled in between the double-walled areas. The material which may be used for this purpose may be, for example, a substance known in the trade under the name "Moltopran."

The paraboloid mirror of the invention may therefore be transported into space in a collapsed or folded condition and thus accommodated within a container which advantageously includes a supply of compressed gas, a granular substance, as well as a supply of the liquid for the formation of the synthetic foam. The container is propelled into space and then an opening therein is formed by automatic means and the collapsed paraboloid mirror is ejected by means of compressed gas. The ring frame is filled with a compressed gas within the inner wall thereof. Thereafter the garnular substance and the liquid are introduced between the inner and outer walls of the ring in order to form a supporting ring or frame of synthetic foam. After solidification of the supporting ring skeleton, the lens body is inflated and the synthetic foam which has been formed of the granular material and the liquid is introduced between the layers of the doubled-walled lens-forming portion. After this latter skeleton structure has solidified, the layer or foil which was inflated with it to form the paraboloid configuration is blown off or otherwise removed so that the mirror is exposed. After releasing the connections of the container which carries the mirror to space, the mirror can then be properly aligned to adjust it relative to the energy generating system.

Of course it should be appreciated that the device may serve other purposes than as a mirror for utilizing solar energy and may, for example, function to supply energy for communication transmission systems which operate in the region of optical waves.

In a preferred arrangement the foil which is removed from a location covering the lens portion is advantageously formed of a plurality of segmental or pie-shaped portions, each of which includes a central steel element or spring which is connected to the inner periphery of the ring frame and which may be coiled at such periphery. The element advantageously includes separation lines which define the pie-shaped sections but which are held integrally together until the mirror has been completely erected. Thereafter the separation lines will be ruptured in any conventional way so that the spring may become effective to roll up the material adjacent the inner periphery of the spring and out of an obstructing position in respect to the lens. To facilitate the actuation of the separation of the covering into rolled-up pie-shaped segments, radially strung wires are provided which reach high temperatures and cause a burning away of the material along the lines of the wire.

Accordingly it is an object of this invention to provide an improved inflatable structure for use in space.

A further object of the invention is to provide an inflatable mirror structure for use in space which includes an outer rim portion made of a double wall element which is adapted to be filled with a solidifying material and a connecting web portion which is adapted to form the lens made of a double wall construction for filling with a solidfying material and with means for inflating the web portion so that it forms a paraboloid shape prior to its solidification.

A further object of the invention is to provide a structure such as a mirror for use in space which includes an outer ring portion of double wall construction with a connecting web of double wall construction, a member connected to the web and spaced therefrom, said member with the web being inflatable to form the web into a preselected curved configuration located within the ring.

A further object of the invention is to provide a structure for use in making space installations which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 1:
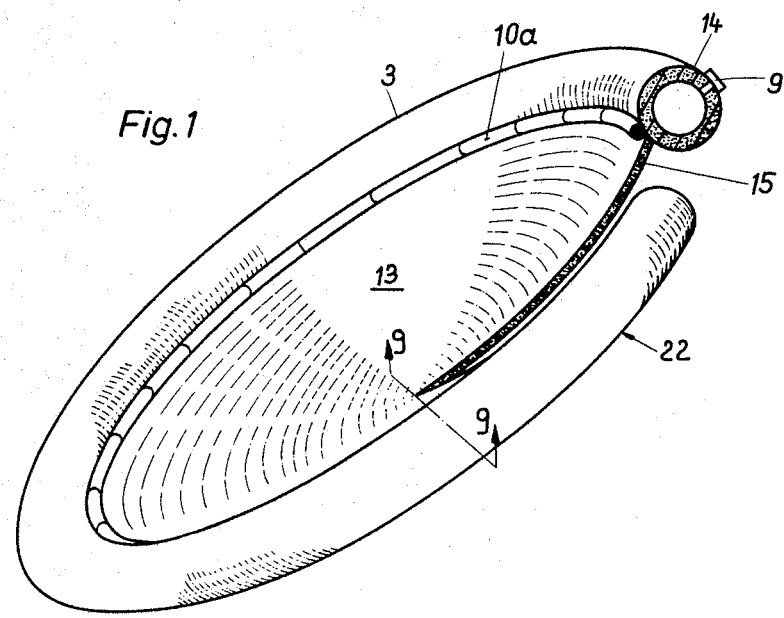
FIG. 1 is a perspective view, partly in section, of a paraboloid mirror constructed in accordance with the invention.
Figure 2:
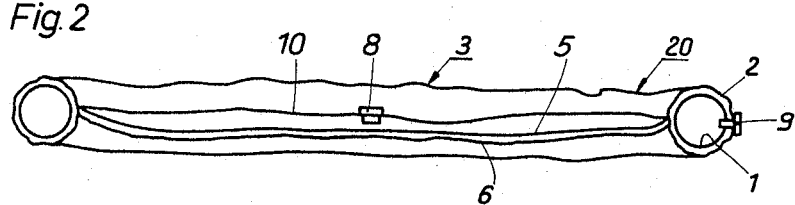
FIG. 2 is a transverse section of the structure used for forming the mirror prior to its erection.
Figure 6:
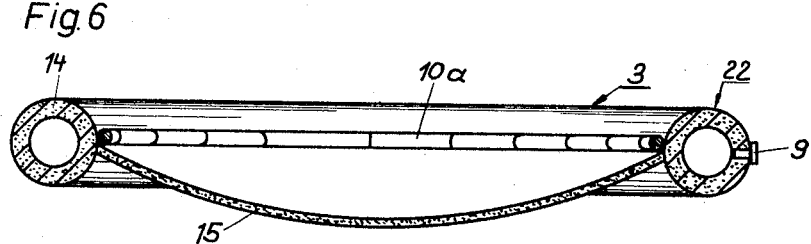
FIG. 6 is a section similar to FIG. 5 indicating the element used for inflation broken away and disposed in a rolled-up condition.

Referring to the drawings in particular the invention embodied therein comprises inflatable structure-forming means generally designated 20 in FIG. 2 which may be erected into a rigid structure generally designated 22, as indicated in FIGS. 1 and 6. In the embodiment of the invention the erected structure 22 comprises a mirror 13 which may be employed, for example, in the utilization of solar energy.

Figure 9:
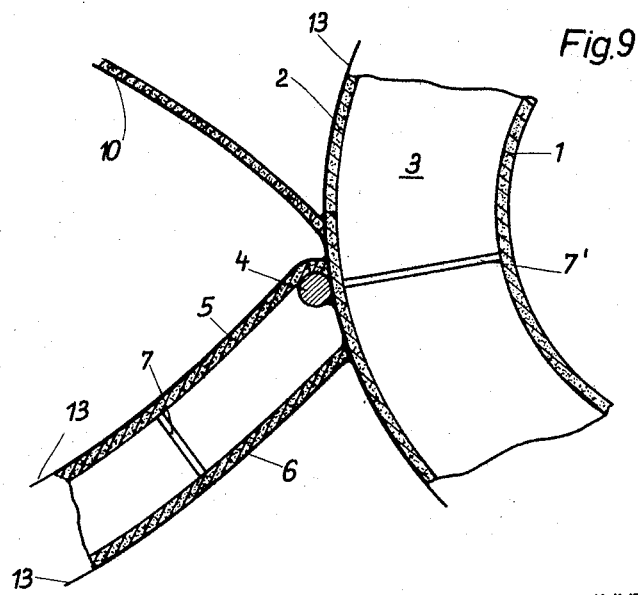
FIG. 9 is an enlarged fragmentary section taken on the line 9—9 of FIG. 1.
Figure 4:
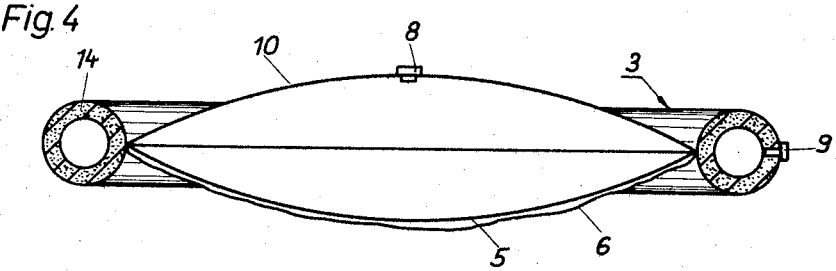
FIG. 4 is a view similar to FIG. 3 indicating the further step of the inflation of the central web portion to orient the mirror lens portion in a paraboloid manner prior to its erection.

In accordance wtih the invention, the device for forming the rigid structure in space 20 comprises a ring or torus section for forming a frame generally designated 3 which is made up of an inner layer wall or foil 1 and an outer layer wall or foil 2 which define an inner inflatable compartment and a surrounding material compartment. As indicated in FIG. 9, a ring 4 of constant diameter is secured to the exterior face of the exterior wall 2 of the torus 3. The ring 4 is partially embraced by the rim or edge of a foil or layer 5. The foil or layer 5 is capable of assuming exactly the shape of a paraboloid. The foil 5 may, for example, be composed of individual sectors or of individual circular rings. As indicated, the foil 5 is connected to the exterior wall 2 directly adjacent the ring 4. An additional wall or foil 6 is also secured to the outer foil 2 around its complete periphery and is held in spaced relationship to the foil 5 by means of spacer element 7. The spacer 7 is held between walls 5 and 6 to maintain the two walls at an approximately constant distance from each other. Spacers 7' are also arranged between the inner and outer walls 1 and 2 of the torus 3. A valve 9 which is diagrammatically indicated in the drawing extends from the exterior of the wall 2 to the interior of the wall 1 and is provided for inflating the space on the interior of the wall 1. An additional wall or inflatable member 10 is connected around its periphery to the exterior of the exterior wall 2 at a location adjacent the edges of the wall 5. This additional wall also has a valve 8 which is diagrammatically indicated and which provides means for introducing a gas into the space between the foils 10 and 5. In an inflated condition of the walls 5 and 10 the wall 5 is formed into the lens body of a mirror, the periphery of which is bounded by the torus 3 (see, for example, FIG. 4).

Figure 7:
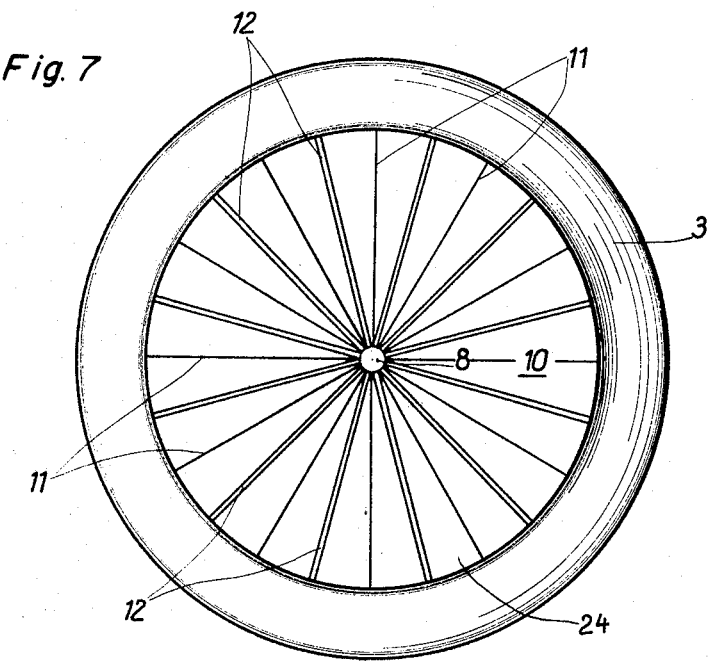
FIG. 7 is a top plan view of the structure in the condition indicated in FIG. 5.

As indicated particularly in FIG. 7, the wall 10 is divided into sectors by means of separating lines or areas 11. Each sector 24 is provided with a centrally arranged radially extending band or strip spring 12. Before the device is ready for operation the separating areas 11 will be separated in any conventional way, and once this is accomplished the springs 12 cause each segment to roll up, as partially indicated in FIG. 8 in various phases, until the entire segment is rolled into a ring indicated 10a in FIG. 1.

If the wall 10 is made of a synthetic material such as polyester, then the separating areas 11 are advantageously formed by heating wires which extend radially outwardly from the inner periphery of the torus 3 along the foil 10. These heating wires are advantageously connected to a current supply, and when they are supplied with current the heat generated causes the separation of the segment 24 along the separating areas 11. The separating areas 11 may also be constituted, for example, as grooves or weakened areas which will rupture upon increase of the gas pressure in the space defined by the walls 5 and 10. In some instances it is desirable that the separating areas may form an annular ring which extends concentrically to the torus 3 adjacent the inner periphery of the outer foil 2. In such event the springs 12 are not required, since the wall 10 is blown off by gas pressure. In those instances where the walls 1, 2, 5 and 6 are made up of a synthetic material, for example, of polyester, then their surfaces which are directed outwardly are provided with a metal layer 13 in order to obtain the maximum possible reflection of the sun rays (see FIGS. 1 and 9). For this metal reflecting surface aluminum or nickel is advantageously employed. The ring 4 is advantageously made of a synthetic material.

For the purpose of transporting the structure consisting of the foils 1, 2, 5, 6 and 10, as indicated in FIG. 2, into space, the structure is inserted into a container (not shown) which also carries a supply of compressed gas, a granulate or granular mass, and a supply of liquid for the formation of a synthetic foam. This synthetic foam is inserted in the spaces defined between the walls 1 and 2 and the walls 5 and 6 and forms in a solidified condition a supporting frame for the folded out torus of the lens body which is embraced thereby. The unfolding of the paraboloid mirror which has been conveyed into outer space proceeds, as indicated in connection with FIGS. 2 to 8.

After the lid of the container (not shown) has been blown off and after release of the folded walls, the interior of the space embraced by the foil 1 of the torus 3 is filled with compressed gas through the valve 9 (see FIG. 2).

Figure 3:
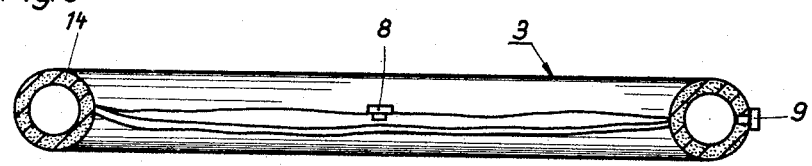
FIG. 3 is a section similar to FIG. 2 indicating the ring portion of the structure in an erected position.
Figure 5:
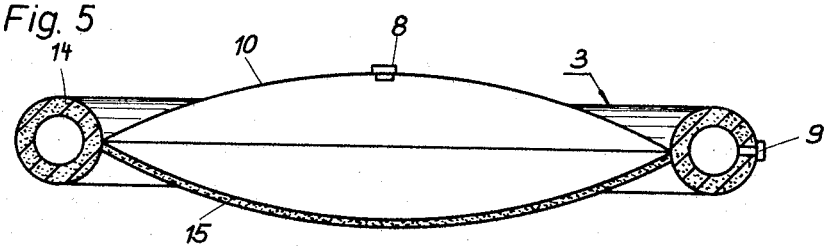
FIG. 5 is a view similar to FIG. 4 with the lens portion in an erected condition.

Through one or several openings (not shown) of the container the synthetic foam which has been formed therein from the granulate and the liquid reaches into the ring-shaped inner space of the torus 3 defined by the walls 1 and 2. The spacers 7 insure that the relative concentric position of the walls 1 and 2 is maintained, while permitting the inflow of the liquid. Synthetic foam forms after the liquid filler solidifies between walls 1 and 2 to form the supporting skeleton 14, as indicated in FIGS. 3 and 1. Thereafter, the space between the walls 5 and 10 is filled with compressed gas through valve 8 so that the walls 5 and 6 are formed into the shape indicated to form the lens body. The diameter of the lens body is determined by the ring 4 (FIG. 9). After the inflation of the space between the walls 5 and 10, the space between the walls 5 and 6 is filled with a synthetic foam. This is accomplished through one or several openings in the foil 6 which have not been indicated. The synthetic foam forms, after its solidification, a further supporting skeleton 15, as indicated in FIG. 5.

Figure 8:
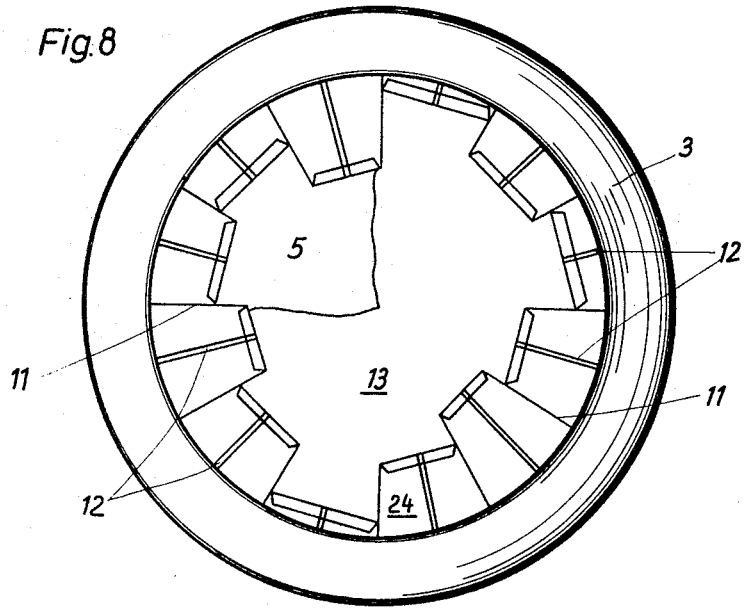
FIG. 8 is a view similar to FIG. 7, indicating the manner in which the member employed for inflation is rolled away.

At this stage of the erection the foil 10 is released from the ring torus 3 such as by supplying current to wires which cause separation along the separating areas 11 and rolling up of each segment 24 which is caused by the springs 12. When this is fully accomplished, a bead 10a is formed around the inner surface of the torus 3. The metal-covered surface 13 of the foil 5 is thus released, as indicated in FIGS. 1, 6 and 8. The paraboloid mirror which is thus formed and which is stabilized by the annular torus is indicated in a fully erected form in FIG. 1. In this state it can then be adjusted or aligned in the usual manner in an energy conversion system or a transmission system which has been transported into space in the same manner.

Such a paraboloid mirror has many important advantages. The exact inner diameter of the torus and the outer diameter of the paraboloid mirror is determined by the ring 4 which has a constant diameter. The ring 4 also insures that the connection between the torus and the paraboloid mirror, after the supporting skeleton 14 has been formed, will be situated in one plane. Due to the metalization of the outwardly directed surfaces of the foil, evaporation and sublimation are decreased. The metal layer 13 also prevents a too strong heating by thermic rays and reduces temperature fluctuation which has been caused by thermic rays and reduces temperature fluctuation which has been caused by varying sun ray impingement during orbiting. The sensitivity of the synthetic materials used relative to ultra-violet rays is also strongly reduced by the presence of the metal layer. The striking of meteorites on the mirror has no significant influence on the geometrical form of the paraboloid mirror after the supporting skeleton has been inserted. Only during the inflation procedure would it be possible for the meteorites to influence the shape of the resultant structure.

While specific embodiments of the invention have been shown and described in detail to illustrate the application of the inventive principles, it will be understood that the invention may be embodied otherwise without departing from such principles.

What is claimed is:

1. A structure for use in space which is constructed in a foldable manner and which may be unfolded into an operative position after it is transported to its destination such as to a location outside the dense layers of the earth, comprising an inflaable torus made up of spaced inner and outer walls forming an inner inflatable compartment and a surrounding material compartment, a lens body comprising spaced inner and outer walls secured peripherally to the interior of said torus, a cover member secured at its periphery around the interior of said torus and defining with said lens body a closed container, means permitting inflation of said closed container for forming said lens body into a curved configuration, and means for removing said cover member from a position covering said lens body upon completion of the erected structure, wherein said means for removing said cover member from a position obstructing said lens body includes radial separation areas defined on said cover member extending from the periphery inwardly toward the center, said cover member being separable along said separation areas, and means for rolling the separated areas up peripherally into individual rolls arranged adjacent the inner periphery of said torus.

2. A device according to claim 1, wherein said separation areas are formed by electrically heatable wires.

3. A structure according to claim 1, wherein said means for rolling each of said separated areas up includes a coilable spring member integrally formed with said cover member at a location centrally of each of the separated areas and connected at one end to the inner periphery of said torus.

4. A method of erecting a structure which structure comprises a foldable torus formed of spaced inner and outer wall elements defining an interior inflatable compartment and a surroundng material compartment, a central double walled lens portion connected at its periphery to the interior periphery of the torus, and a cover member connected at its periphery to the interior of said torus, comprising inflating the torus to form an annular frame, injecting an initially soft material which will harden into a rigid structure into the material compartment between the inner and outer walls of said torus and permitting it to solidify to form a rigid frame structure, inflating the space between the cover member and said lens portion to form said lens portion into a desirable curved configuration, thereafter injecting a rigid structure-forming material into the space between the walls of said lens portion to form the lens portion into a rigid structure supported within said torus frame, and removing said cover member from a position blocking said lens portion, said cover member being made up of a plurality of sectors, each separated by heating wires which extend radially from the periphery of said torus inwardly to a central location, which segments include spring means for rolling each separated by heating wires which extend radially from torus, and wherein the step of removing said cover member comprises heating the wires forming the separating areas until the separating areas rupture permitting the springs to roll said sectors up adjacent the interior periphery of said torus.

References Cited

UNITED STATES PATENTS

| 3,054,328 | 9/1962 | Rodgers | 88—73 |
| 3,098,229 | 7/1963 | Raabe | 343—915 |
| 3,110,552 | 11/1963 | Voelker | 264—45 |

FOREIGN PATENTS 1,048,681   8/1953   France.

OTHER REFERENCES

Missiles and Rockets, "Paraballoon Antennas—New Space Tool," Jan. 11, 1960, pages 21, 22 and 25.

JEWELL H. PEDERSEN, *Primary Examiner.*

R. J. STERN, *Assistant Examiner.*